United States Patent
Supino

[19]

[11] Patent Number: 5,841,604
[45] Date of Patent: Nov. 24, 1998

[54] MASTERLESS SPINDLE SYNCHRONIZATION IN A MULTIPLE DISK DRIVE STORAGE SYSTEM

[75] Inventor: Louis Supino, Boulder, Colo.

[73] Assignee: Cirrus Logic, Inc., Fremont, Calif.

[21] Appl. No.: 851,552

[22] Filed: May 6, 1997

Related U.S. Application Data

[63] Continuation of Ser. No. 432,449, May 1, 1995, abandoned, which is a continuation-in-part of Ser. No. 167,778, Dec. 15, 1993, abandoned.

[51] Int. Cl.$^6$ .................................................. G11B 15/46
[52] U.S. Cl. .................................... 360/73.03; 360/73.02; 318/85; 318/625
[58] Field of Search ........................... 360/73.03, 73.02, 360/73.01, 71, 69; 318/85, 625, 53, 41, 69, 79, 80, 672

[56] References Cited

U.S. PATENT DOCUMENTS

| | | | |
|---|---|---|---|
| 5,159,503 | 10/1992 | Mitamura et al. | 360/73.03 X |
| 5,216,654 | 6/1993 | Itoh et al. | 360/73.02 X |
| 5,237,466 | 8/1993 | Glaser et al. | 360/73.03 |
| 5,276,569 | 1/1994 | Even | 360/73.02 |
| 5,303,097 | 4/1994 | Baba et al. | 360/73.03 X |
| 5,416,648 | 5/1995 | Jeppson et al. | 360/73.02 |
| 5,598,303 | 1/1997 | Jones et al. | 360/73.02 |
| 5,657,177 | 8/1997 | Shibara | 360/73.03 |

*Primary Examiner*—Aristotelis M. Psitos
*Assistant Examiner*—Larry T. Cullen
*Attorney, Agent, or Firm*—Howard H. Sheerin; Dan A. Shifrin

[57] ABSTRACT

In a storage system using multiple disk drives, the disk drive spindles are rotated at the same frequency and at a predetermined phase relationship. A phase angle, measured as the difference between an index mark recorded on the disk and the disk's read head, is used to control the spindle rotation speed. Each of the disk drives are first independently frequency locked to a target frequency, and once frequency locked, each disk drive is phase locked in relation to one another. In the phase locking process, each disk generates a synchronizing signal for synchronizing the rotation of the disks to a predetermined phase relationship. If any one of the disk drives becomes inoperable (due to a failure or "hot-swapping"), the other disk drives remain synchronized since the synchronizing signal is not lost.

22 Claims, 6 Drawing Sheets

MASTERLESS SPINDLE SYNCHRONIZATION IN A MULTIPLE DISK DRIVE STORAGE SYSTEM

This application is a continuation of application Ser. No. 08/432,449 filed May 1, 1995, now abandoned, which is a continuation-in-part of application Ser. No. 08/167,778, filed Dec. 15, 1993, now abandoned.

FIELD OF INVENTION

The present invention relates to the field of computer data storage systems, and particularly, to a storage system that uses multiple disk drives having synchronized spindle rotation.

BACKGROUND OF THE INVENTION

Magnetic and optical disk drives are often used as a Direct Access Storage Device (DASD) for computer systems. Inside the disk drive a spindle rotates a medium, such as a magnetic or optical disk, underneath a transducing head. When writing data to the disk, digital data serves to modulate operation of the transducing head in order to record the data onto the disk in a series of concentric tracks. For example, in magnetic disk drives the digital data modulates the current in a coil of a magnetic write head in order to write a corresponding series of magnetic flux transitions onto the surface of a magnetic disk. To read this recorded data, the transducing head again passes over the medium and generates a read signal processed by read channel circuitry which detects and decodes the digital data.

With the dramatic decrease in the manufacturing cost of disk drives, a single storage system commonly incorporates multiple disk drives, thereby increasing the data processing reliability and efficiency. For example, storing the same data block on M disk drives at locations 360/M degrees apart decreases the access time to the data block. The largest spindle angle between the start of the data block and the read head is 360/M degrees as opposed to 360 degrees in a single drive system. U.S. Pat. No. 5,237,466 entitled, "Method and Apparatus for Programmably Controlling Spindle Synchronization and Phase Among Disk Drives in a Storage Subsystem" issued to Glaser et al., discloses a method and apparatus for controlling rotation of the M disk drives to achieve the 360/M degree phase relationship between the spinning disk drives.

Another advantage to a multiple disk drive storage system is that multiple copies of the same file can be stored on more than one drive. If one of the disk drive crashes, the file can still be retrieved from one of the operable disk drives. That is, multiple disk drive storage systems provide an automatic and concurrent backup capability, a vast improvement over the more cumbersome tape backup systems.

Yet another advantage is to reduce the overall latency of the storage system by interleaving the data blocks of a file over the multiple disks. In this manner, multiple data blocks can be retrieved in parallel, thereby reducing the overall access time to read the file. Interleaving the data blocks also allows very large files, such as large image files, to be stored on the multiple disk drives where one disk drive would not provide enough memory.

To achieve the above advantages, it is necessary that the storage disks of the multiple disk drives be rotated at the same frequency and at a predetermined phase relationship. Techniques for controlling the frequency and phase relationship of the rotating disks are well known. Most commonly, the disks are first frequency locked to a target frequency and then phase locked to a selected one of the rotating disks.

To frequency lock each disk: a phase angle is measured between an index mark recorded on the disk and the read head; a time period for the phase angle to change by 360 degrees is compared to a target_time_period; and the time difference operates to control the spindle rotation speed. After the disks are locked to the target rotation frequency (1/target_time_period), they are phase locked to a predetermine one of the disk drives known as the master disk drive. This is achieved by measuring the difference between the phase angle of the master disk drive and the phase angle of the other disk drives. The phase difference operates to control the spindle rotation speed.

An example prior art method for synchronizing rotation of a multiple disk drive storage system is described in U.S. Pat. No. 5,237,466 entitled, "Method and Apparatus for Programmably Controlling Spindle Synchronization and Phase Among Disk Drives in a Storage Subsystem" issued to Glaser et al., the disclosure of which is hereby incorporated by reference.

A problem with prior art techniques that synchronize spindle rotation of multiple disk drives to a predetermined master disk drive is that if the master disk drive crashes, the remaining disk drives will lose synchronization and the storage system will fail. The storage system must be shut down and the master disk drive replaced. Taking a storage system off-line in order to replace the master disk drive is highly undesirable.

Yet another problem with synchronizing to a master disk drive is that the master drive cannot be "hot-swapped" (replaced on-the-fly without shutting down the storage system.) Therefore, "juke-box" storage systems that interchange the disk drives on-the-fly are less reliable if implemented using the prior art master synchronization method.

What is needed is a masterless method for synchronizing the spindles of multiple disk drives in a storage system where synchronization is maintained if any one of the multiple disk drives crashes or if any one of the multiple disk drives is "hot-swapped".

SUMMARY OF THE INVENTION

In a storage system using multiple disk drives, the disk drive spindles are rotated at the same frequency and at a predetermined phase relationship. A phase angle, measured as the difference between an index mark recorded on the disk and the disk's read head, is used to control the spindle rotation speed. Each of the disk drives are first independently frequency locked to a target frequency, and once frequency locked, each disk drive is phase locked in relation to one another. In the phase locking process, each disk generates a synchronizing signal for synchronizing the rotation of the disks to a predetermined phase relationship. If any one of the disk drives becomes inoperable (due to a failure or "hot-swapping "), the other disk drives remain synchronized since the synchronizing signal is not lost.

Frequency locking the multiple disk drives comprises the steps of: spinning up each disk drive to a predetermined rotation frequency; loading a counter with a target_time_period; decrementing the counter at a predetermined clock rate; and using the content of the counter to adjust the speed of the corresponding spindle when the phase angle of the index mark rotates through 360 degrees. When the disk drive has achieved frequency lock, the content of the counter is zero when the phase angle reaches 360 degrees (zero degrees.)

Once all of the disk drives are locked to the target frequency (1/target_time_period), the system switches into a phase lock mode but does not disturb the current operation of the counters. A terminal count output from each counter are ORed together to generate a synchronizing signal. Initially, each counter contains a different value because the disk drives are not yet phase locked. The first counter to reach terminal count (i.e., the first phase angle to reach zero degrees) activates the ORed synchronizing signal which resets all of the counters with the target_time_period. The counters are decremented at the predetermine clock rate and when the index mark is detected, the content of the corresponding counter represents the phase difference between the spindle's phase angle and the synchronizing signal. The counter value operates to adjust the spindle rotation speed in the direction that decreases the phase difference. When all of the counters simultaneously reach terminal count, their ORed terminal count outputs generate the synchronizing signal which again re-loads all of the counters with the target_time_period. This process continues until the disk drives are phase locked to one another.

Because every disk drive generates the phase synchronizing signal (terminal count), the phase relationship is maintained once the disk drives are phase locked even if any one of the disk drive crashes or if any one of the disk drives is replaced on-the-fly (i.e., "hot-swapped"). In other words, continuing operation of the storage system is not dependent on the continuing operation of a predetermined one of the disk drives (i.e., a master disk drive.)

DETAILED DESCRIPTION OF THE DRAWINGS

Conventional Spindle Synchronization

Figure 1:
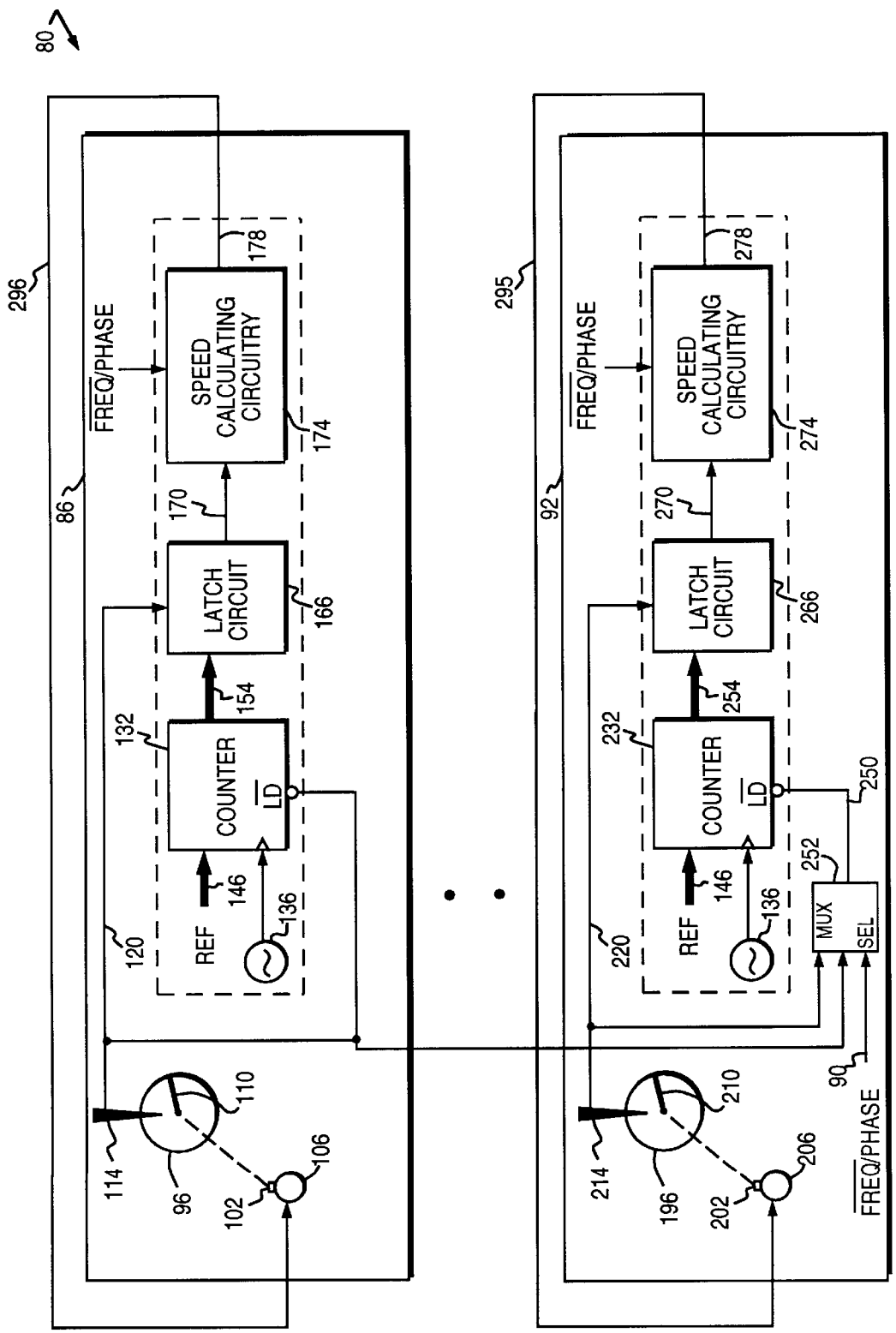
FIG. 1 shows a prior art implementation for frequency and phase locking multiple disk drives to a master disk drive.
Figure 3:
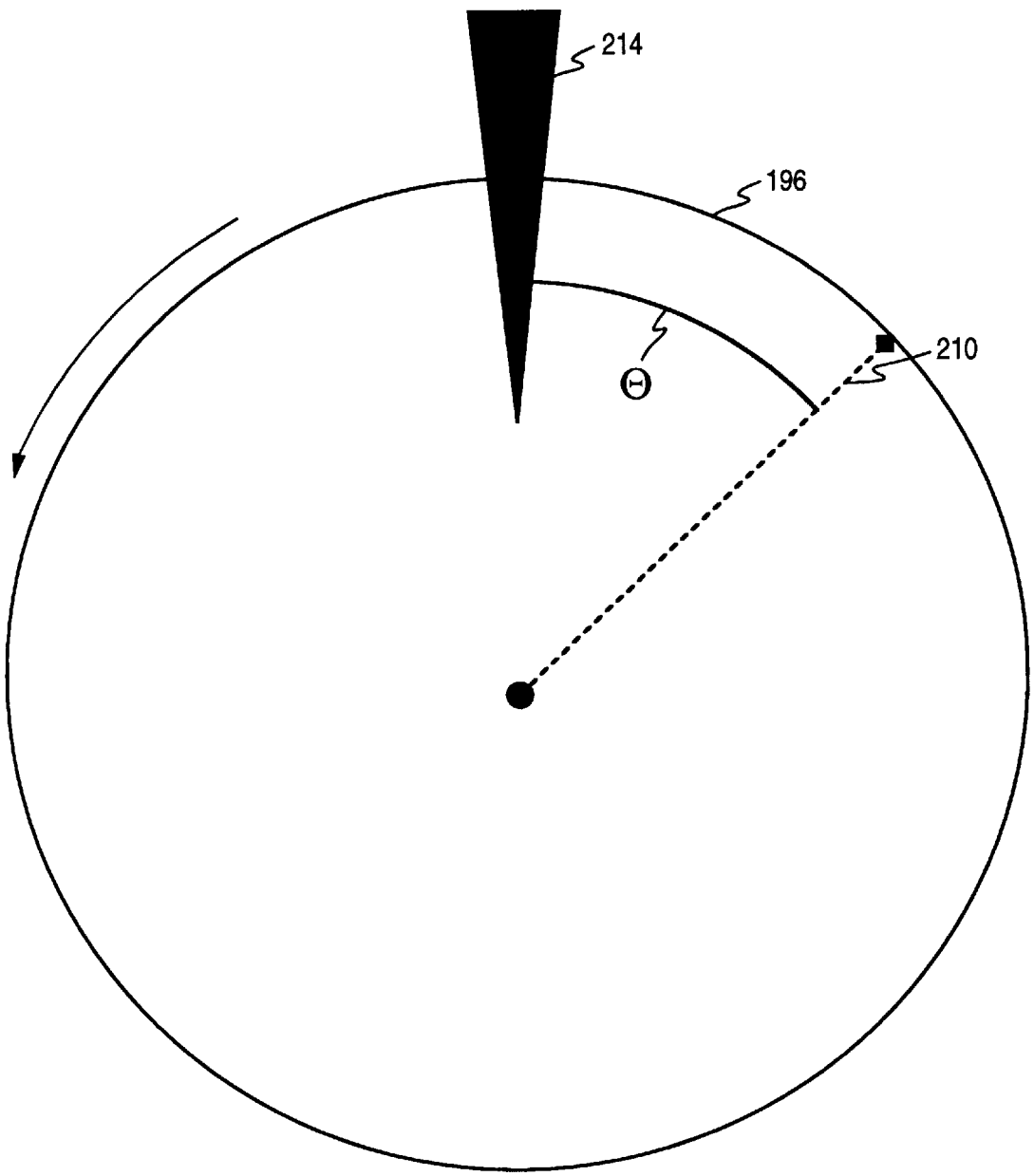
FIG. 3 shows a storage disk having an index mark recorded thereon and a read head positioned there above.

FIG. 1 shows the conventional method for frequency and phase locking the multiple disk drives of a multiple disk drive storage system. One of the disk drives 86, designated as a master, generates a synchronizing signal 120 for synchronizing the other disk drives according to a predetermined phase relationship. A phase angle is measured as the distance from an index mark (110,210) recorded on the disk (96,196) and a corresponding read head (114,214). This phase angle is illustrated in greater detail in FIG. 3. The synchronizing signal 120 is activated when the index mark 110 of the master disk drive is detected by its corresponding read head 114 (i.e., when the phase angle of the master disk drive is zero).

Before phase locking the disk drives using the synchronizing signal 120 from the master disk drive 86, all of the disk drives are independently frequency locked to a predetermined reference frequency. A FREQ/PHASE control signal 90 disables the synchronizing signal 120 through a multiplexor 252 in each of the slave disk drives (only one slave disk drive 295 is shown) and selects a frequency lock signal 220 as the load signal LD 250 of a counter 232. The master disk drive 86 uses the synchronizing signal 120 as its frequency lock signal to load its counter 132. The frequency lock signals (120,220) are activated when the corresponding index marks (110,210) are detected by the corresponding read heads (114,214). When the index mark (110,210) is detected, the corresponding counter (132,232) is loaded with a reference value 146 and decremented at a predetermined clock rate 136.

The reference value 146 corresponds to the desired spindle rotation frequency and the counter will decrement to zero simultaneous with the corresponding index mark (110, 210) being detected if the disk is frequency locked. If the disk (96,196) is rotating to fast, then the counter will not have reached zero when the index mark is detected, and if the disk (96,196) is rotating too slow, then the counter will have under flowed. The frequency lock signal (120,220) latches (166,266) the value (154,254) in the counter (132, 232) when the index signal (110,210) is detected by the read head (114,214). The latched signal (170,270) is applied to speed calculating circuitry (174,274) which generates a motor control signal (296,295) and applies it to a spindle motor (106,206). The spindle motor (106,206) rotates the disk at a varying speed according to the motor control signal until the disk is substantially locked to the reference frequency 146.

When all of the disk drives are locked to the reference frequency 146, the FREQ/PHASE control signal 90 selects, via the multiplexor 252, the synchronizing signal 120 from the master disk drive 86. The synchronizing signal 120 loads all of the counters 232 in the slave disk drives 295 when the index signal 110 of the master disk drive is detected by its read head 114. The value in the slave disk drive counter 232 is latched 266 by the corresponding index detect signal 220 and used to vary the frequency (and thereby the phase) of the corresponding spindle 202. Eventually the slave disk drive 295 will be phase locked with the master disk drive 86 such that their index marks (110,210) are detected at the same time.

The problem with the conventional method for synchronizing the spindles of multiple disk drives is that the slave disk drives will lose the synchronization signal 120 if the master disk drive becomes inoperable.

Masterless Spindle Synchronization

The present invention overcomes the problem associated with losing the synchronization signal from a master disk drive by having every disk drive generate a synchronization signal. In this manner, the disk drives will remain synchronized if any one of the disk drives becomes inoperable.

Figure 2:
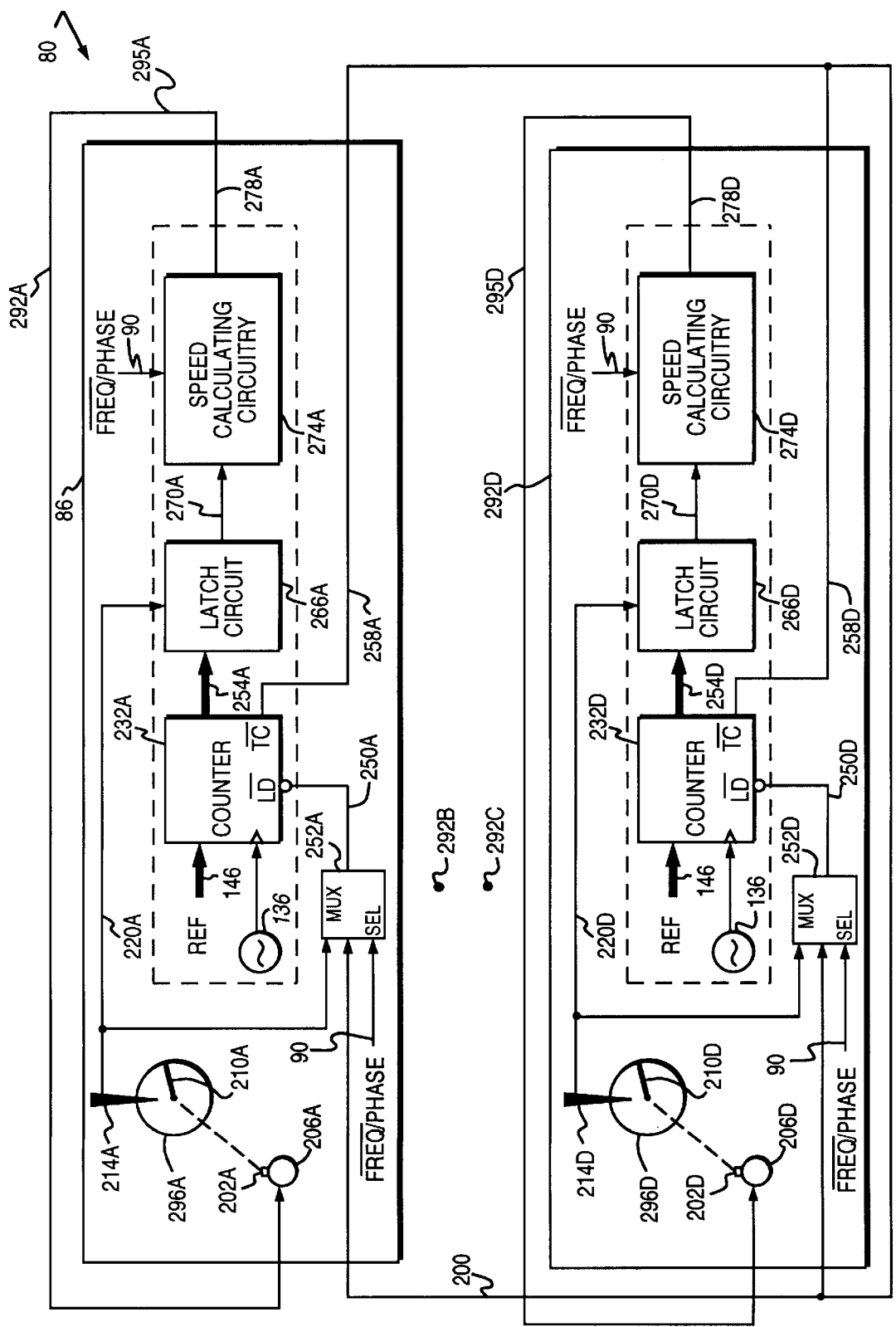
FIG. 2 shows the implementation of the present invention for masterless synchronization of multiple disk drives.

An overview of the masterless synchronization method in a multiple disk drive storage system is shown in FIG. 2. Four disk drives 292A–292D (disk drives 292B–292C are represented as dots) incorporate the same circuitry and no one is a master. The circuitry in each disk drive operates similar to the conventional spindle synchronization circuit of FIG. 1. The difference between FIG. 1 and FIG. 2 is that the synchronization signal 200 for phase locking the drives is generated by wire ORing a terminal count output 258A–258D from each disk drive rather than using the index detect signal 120 from a master disk drive 86. A multiplexor 252A–252D selects between the frequency and phase lock modes similar to the multiplexor 252 in the slave disk drives of FIG. 1.

A detailed description of the frequency and phase lock modes in relation to the circuit diagram of FIG. 2 is provided in the following sections.

Frequency Lock

Figure 4:
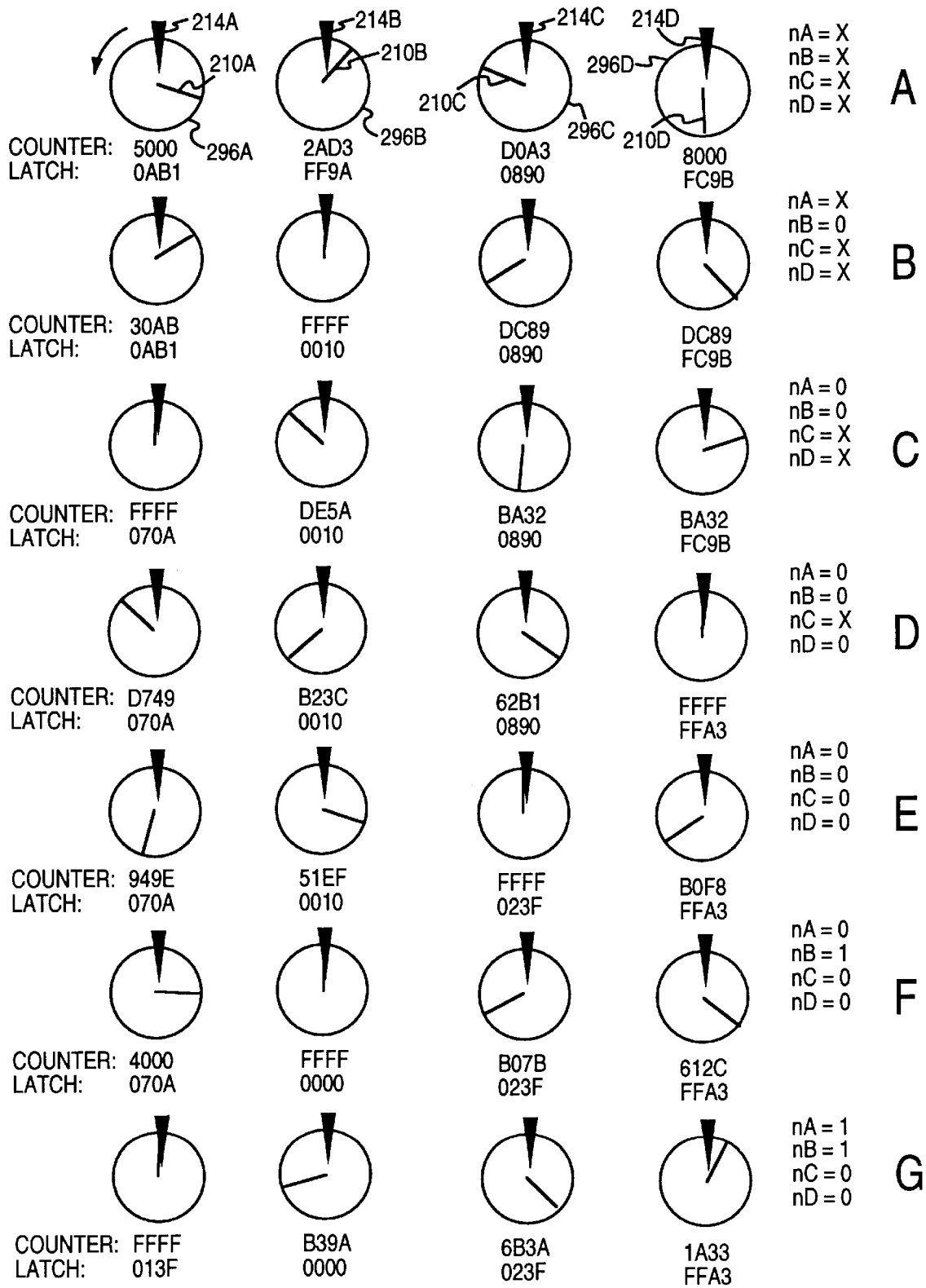
FIGS. 4A–G shows the disk drive phase angles during frequency lock and the corresponding control signals.

FIG. 4 illustrates the operation of the masterless synchronization method of the present invention during the frequency lock mode. The disks 296A–296D of FIG. 2 are depicted as rotating in a counter-clockwise direction with their index marks 210A–210D being detected by a corresponding read head 214A–214D. Shown below each disk 296A–296D is the value stored in the corresponding counter 232A–232D and latch circuit 266A–266D. Index values $n_A$–$n_B$ shown to the right of the disks 296A–296D represent the number of times the corresponding index mark 210A–210D has been detected by the read head 214A–214D.

The storage system 80 enters frequency lock mode by setting the FREQ/PHASE control signal 90 low in order to connect the index detect signal 220A–220D, through the multiplexor 252A–252D, to the load signal 250A–250B of the counters 232A–232D for loading the target_time_period 146.

Before locking the disk drives 292A–292B to the target frequency (1/target_time_period), speed calculating circuitry 274A–274D ignores the latch signal 270A–270D and generates an initial speed control signal 295A–295D for a predetermined amount of time in order to "spin-up" the disks 296A–296D. Once the disks 296A–296D are spinning, the speed calculating circuitry 274A–274D generates the speed control signal 295A–295D in response to the latch signal 270A–270D in order to frequency lock the disks as shown in lines A–G of FIG. 4.

Starting with line A, the values in the latches 266A–266D reflect the current spindle control command. For the first disk 296A, the latch 266A stores the hex value 0AB1 which indicates the disk 296A is spinning too fast, and the speed control signal 295A operates to decrease the spindle 202A speed. The latch 266B of the second disk 296B stores the hex value FF9A which indicates the disk 296B is spinning to slow, and the speed control signal 295B operates to increase the spindle 202B speed. Similarly, the latches 266C–266D of disks 296B–296D store values indicating their off-speed status. The index values $n_A$–$n_B$ are in an undefined state X since an index mark 210A–210D has yet not been detected in the frequency lock mode.

Continuing to line B, when the index mark 210B of the second disk drive 292B is detected by the read head 214B, the hex value 0010 stored in its counter 232B indicates that the disk 296B is spinning closer to the target frequency (1/target_time_period), but now too fast. The counter value 254B is latched into latch circuit 266B and used by the speed control circuitry 274B to generate a speed control signal 295B in order to decrease the spindle 202B speed. The counter 232B is loaded by the index detect signal 220B with the target_time_period 146. The index value $n_B$ is set to 0 indicating that the index mark 210B has been detected for the first time during the frequency lock mode.

Operation of the disk drives 292A–292B continues in this manner until they are all independently frequency locked to the target frequency (1/target_time_period) as indicated by a counter value 254A–254D of zero when the index mark 210A–210D is detected. For example, when the index mark 210B of the second disk drive 296B is detected in line F, the counter value 254B is zero indicating that the disk 296B is frequency locked.

Once the disk drives 292A–292B are frequency locked, the storage system 80 transition into the phase lock mode in order to synchronize rotation of the spindles 202A–202D to a predetermined phase relationship.

Phase Lock

Figure 5:
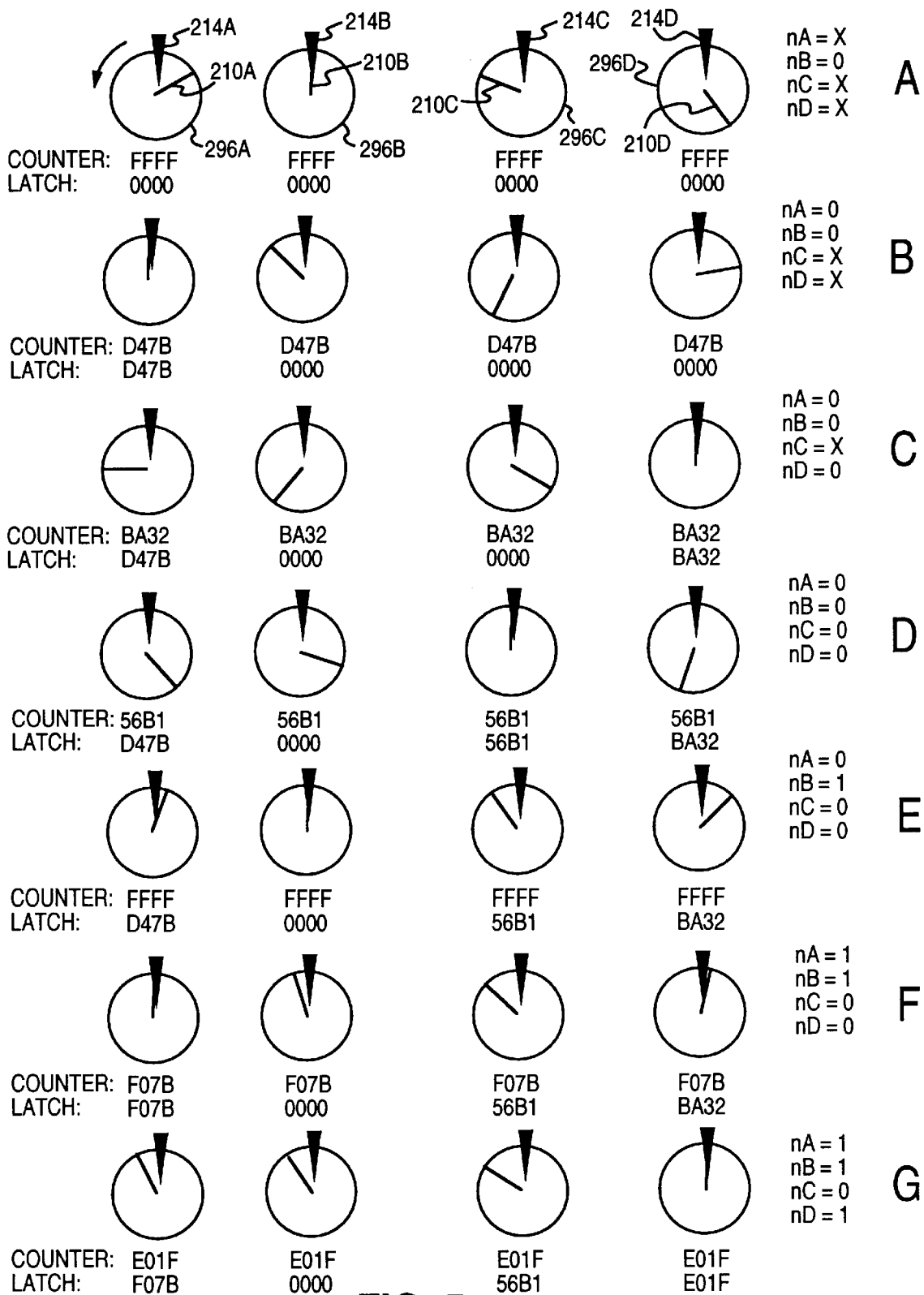
FIGS. 5A–G shows the disk drive phase angles during phase lock and the corresponding control signals.

Operation of the phase lock mode is understood with reference to FIG. 5. The disks 296A–296D of FIG. 2 are depicted as rotating in a counter-clockwise direction with their index marks 210A–210D being detected by a corresponding read head 214A–214D. Shown below each disk 296A–296D is the value stored in the corresponding counter 232A–232D and latch circuit 266A–266D. Index values $n_A$–$n_B$ shown to the right of the disks 296A–296D represent the number of times the corresponding index mark 210A–210D has been detected by the read head 214A–214D.

The storage system 80 enters phase lock mode by setting the FREQ/PHASE control signal 90 high in order to connect the synchronizing signal 200, through the multiplexor 252A–252D, to the load signal 250A–250B of the counters 232A–232D for loading the target_time_period 146.

Referring to line A of FIG. 5, since the disk drives are frequency locked, the latch circuits 266A–266D are initially zero. The counter 232B of the second disk drive 292B is the first to generate a terminal count synchronizing signal 258B during the phase lock process (i.e., the drive having its phase angle reach zero first.) In this manner, the other disk drives phase lock to the phase angle of the second disk 296B. The terminal count synchronizing signal 258B causes all of the counters 232A–232D to re-load the target_time_period 146 (hex value FFFF.) The index value $n_B$ is set to 0 indicating that the index mark 210B has been detected for the first time during the phase lock mode.

Continuing to line B, when the index mark 210A of the first disk drive 292A is detected by the read head 214A, the hex value D47B stored in its counter 232A indicates that the difference between the phase angle of its disk 296A and the synchronizing disk 296B is less than 180 degrees. The index detected signal 220A latches 266A the counter value 254A, and the speed calculating circuitry 274A generates a speed control signal 295A that increases the rotation speed of the spindle 202A in order to decrease the phase difference.

When the index mark 210C of the third disk drive 292C is detected by the read head 214C as shown in line D, the hex value 56B1 indicates that the difference between the phase angle of its disk 296C and the synchronizing disk 296B is greater than 180 degrees. The index detected signal 220C latches 266C the counter value 254C, and the speed calculating circuitry 274C generates a speed control signal 295C that decreases the rotation speed of the spindle 202A in order to decrease the phase difference.

Continuing to line E, the phase angle of the synchronizing disk again reaches zero degrees meaning that all of the counters 232A–2132D have simultaneously reached terminal count, causing each disk drive to generate a synchronizing terminal count signal 258A–258D. If the initial synchronizing disk drive 292B becomes inoperable or is "hot-swapped", the other disk drives will still phase lock and remain phase locked since the synchronizing signal 200, generated by each disk drive, is not lost.

Referring now to line F, when the index mark 210A of the first disk drive 292A is detected by the read head 214A, the phase angle difference between its disk 296A and the synchronizing disk 292B is smaller than in line B but still not zero. The hex value F07B stored in the counter 232A is a smaller negative number than the hex value D47B of line B which decreases the magnitude of the speed control signal 295A. Eventually the phase angle difference between the disks 296A–296D settles to zero and the disk drives 292A–292D are in phase lock. The phase lock relationship will persist even if the original synchronizing disk 292B is removed because the synchronizing signal 200 is generated by the terminal count synchronizing signal 258A–258D from each disk drive (i.e., there is no "master" disk drive.)

Speed Calculating Circuitry

Figure 6:
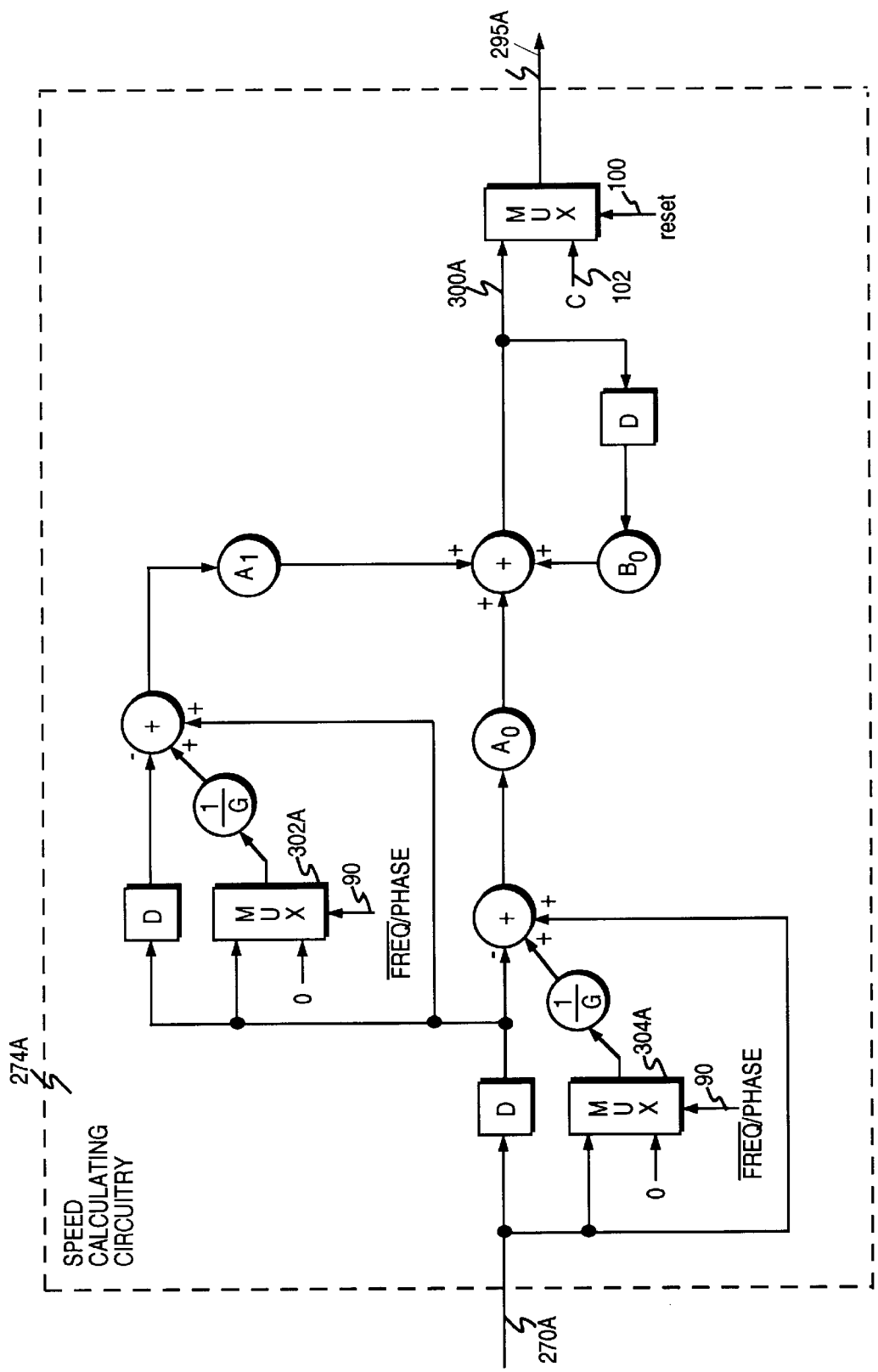
FIG. 6 shows a circuit diagram of the speed calculating circuitry for controlling the spindle rotation speed.

The speed calculating circuitry 274A for disk drive 292A (and duplicated for disk drives 292B–292C) is shown in FIG. 6.

When the disk drive is initially turned on, a reset signal 100 selects a constant C 102 as the speed control output signal 295A in order to "spin up" the disk 296A. After a predetermined amount of time, the reset signal 100 selects a calculated control signal 300A as the speed control output signal 295A in order to begin the frequency lock process.

During frequency lock, the FREQ/PHASE control signal 90 is held low such that multiplexors 302A and 304A output a zero. The calculated control signal 300A is generated in response to the latched counter value 270A as:

$$U(n_A)=U(n-1)\cdot B_0+(CNTR_A(n_A)-CNTR_A(n_A-1))\cdot A_0+(CNTR_A(n_A-1)-CNTR_A(n_A-2))\cdot A_1;$$

where:

$U(n_A)$=the calculated control signal 300A;

$n_A$=the index value indicating the number of times the index mark 210A has been detected;

$CNTR_A(n_A)$=the latched counter value 270A; and $A_0$, $A_1$ and $B_0$=predetermined coefficients.

When $CNTR_A(n_A)-CNTR_A(n_A-1)$, the speed error, becomes less than a pre-determined value, the storage system 80 switches into phase lock mode.

During phase lock, the FREQ/PHASE control signal 90 is held high such that multiplexors 302A and 304A output the latched counter value 270A. The calculated control signal 300A becomes:

$$U(n_A)=U(n-1)\cdot B_0+(CNTR_A(n_A)-CNTR_A(n_A-1)+CNTR_A(n_A)/G)\cdot A_0+ (CNTR_A(n_A-1)-CNTR_A(n_A-2)+CNTR_A(n_A-1)/G)\cdot A_1 ;$$

where:

$U(n_A)$=the calculated control signal 300A;

$n_A$=the index value indicating the number of times the index mark 210A has been detected;

$CNTR_A(n_A)$=the latched counter value 270A; and $A_0$, $A_1$, $B_0$ and $G$=predetermined coefficients.

Many changes in form and detail could be made without departing from the spirit and scope of the present invention; the particular embodiments disclosed are not intended to be limiting. For instance, the phase angles of the disks 292A–292D could be phase locked in an offset relationship by delaying the counter load signals 250A–250D. A software implementation could also replace the circuitry for implementing the spindle synchronization. These and other modifications derived from the disclosed embodiment are within the intended scope of the present invention as properly construed from the following claims.

I claim:

1. A masterless method for synchronizing a plurality of rotating storage disks, wherein:

(a) each storage disk having an index mark recorded thereon and a read head positioned there above;

(b) each storage disk having a phase angle measured from the read head to the index mark; and (c) each storage disk having a counter having a terminal count output, the terminal count outputs being ORed together to generate a synchronizing signal;

the masterless method comprising the steps of:

(a) spinning up each storage disk to a predetermined initial rotation frequency;

(b) loading each counter with a value corresponding to a target rotation frequency;

(c) decrementing each counter at a predetermined clock rate;

(d) when the read head detects the index mark, generating a control signal in response to a count value stored in the counter and reloading the counter with the value corresponding to the target rotation frequency;

(e) repeating steps (b) through (d) until a rotation frequency of each storage disk substantially matches the target rotation frequency;

(f) switching to a phase lock mode;

(g) detecting the first counter to reach terminal count;

(h) reloading each counter with the value corresponding to the target rotation frequency;

(i) when the read head detects the index mark, generating a control signal for the corresponding storage disk in response to a count value stored in the corresponding counter;

(j) controlling the rotation frequency of each storage disk in response to the corresponding control signal;

(k) when the counters simultaneously reach terminal count, reloading each counter with the value corresponding to the target rotation frequency; and (l) repeating steps (i) through (k) until the storage disks are substantially phase locked to the storage disk corresponding to the counter in step (g).

2. A masterless method for synchronizing a plurality of rotating storage disks, wherein:

(a) each storage disk having an index mark recorded thereon and a read head positioned there above; and (b) each storage disk having a phase angle measured from the read head to the index mark;

the masterless method comprising the steps of:

(a) frequency locking each storage disk to a predetermined target rotation frequency; and (b) switching to a phase lock mode and phase locking the plurality of storage disks using a synchronizing signal generated by at least two of the storage disks, comprising the steps of:

(i) detecting the first phase angle to reach a predetermined phase angle value; and (ii) phase locking to the storage disk corresponding to the detected phase angle.

3. The masterless method as recited in claim 2, wherein the step of frequency locking each storage disk comprises the steps of:

(a) spinning up the storage disk to a predetermined initial rotation frequency;

(b) measuring a rotation period of the storage disk by measuring a time the phase angle changes by 360 degrees;

(c) generating a control signal relative to a difference between the rotation period as measured in step (b) and a target rotation period corresponding to the target rotation frequency; and (d) controlling the rotation period of the storage disk in response to the control signal.

4. The masterless method as recited in claim 3, wherein the step of measuring a rotation period of the storage disk comprises the steps of:

(a) detecting when the index mark passes under the read head; and (b) measuring a time before the index mark again passes under the read head.

5. The masterless method as recited in claim 3, wherein the step of generating a control signal comprises the steps of:
   (a) clocking a counter associated with each storage disk relative to a value corresponding to the target rotation frequency;
   (b) when the index mark is detected by the read head, generating the control signal in response to a value in the counter.

6. The masterless method as recited in claim 5, wherein at least two of the counters generate a terminal count signal for generating the synchronizing signal.

7. The masterless method as recited in claim 2, wherein each storage disk having a counter, the step of detecting when one of the phase angles first reaches a predetermined phase angle value comprises the steps of:
   (a) clocking the counters relative to a value corresponding to the target rotation frequency; and
   (b) detecting when one of the counters first reaches a predetermined count.

8. The masterless method as recited in claim 7, wherein:
   (a) the counters are loaded with the value corresponding to the target rotation frequency and decremented at each clock; and
   (b) the predetermined count is zero.

9. The masterless method as recited in claim 2, wherein the step of phase locking to the storage disk corresponding to the detected phase angle comprises the steps of:
   (a) measuring, for each storage disk, a phase difference relative to the synchronizing signal;
   (b) generating, for each storage disk, a control signal in response to the corresponding phase difference; and
   (c) controlling, for each storage disk, a rotation frequency in response to the corresponding control signal.

10. The masterless method as recited in claim 9, wherein each storage disk having a counter, the step of measuring a phase difference comprises the steps of:
    (a) synchronously clocking the counters relative to a value corresponding to the target rotation frequency; and
    (b) reading a value from each counter when the corresponding read head detects the index mark.

11. The masterless method as recited in claim 10, wherein at least two of the counters generate a terminal count signal for generating the synchronizing signal.

12. A masterless synchronization circuit for synchronizing a plurality of rotating storage disks, wherein an index mark is recorded on each storage disk, a read head is positioned above each storage disk, and a phase angle is associated with each storage disk measured from the read head to the index mark, synchronization circuit comprising:
    (a) a detector for detecting when the index mark passes under the read head, having an index detected signal output;
    (b) a counter, associated with each storage disk, having a load signal input and a terminal count signal output;
    (c) an OR circuit, connected to receive the terminal count signal output from the counters, having an ORed signal output; and
    (d) a multiplexor associated with each storage disk, connected to receive the index detected signal and the ORed signal, having a select signal input for selecting between a frequency lock and phase lock mode, having a multiplexor output connected to the index detected signal in frequency lock mode and the ORed signal in phase lock mode, the multiplexor output connected to the load signal input of the corresponding counter;
    wherein:
    (a) the multiplexor select signal input is set to frequency lock mode;
    (b) each counter is loaded with a value corresponding to a target rotation frequency;
    (c) each counter is decremented at a predetermined clock rate;
    (d) when the detector detects the index mark, a corresponding control signal is generated in response to a count value stored in the counter and the counter is reloaded with the value corresponding to the target rotation frequency;
    (e) when the storage disks are substantially frequency locked to the target rotation frequency, the multiplexor select signal input is set to the phase lock mode such that the ORed signal is connected to the load signal input of the corresponding counter;
    (f) when one of the counters first reaches terminal count, the counters are reloaded with the value corresponding to the target rotation frequency;
    (g) when the detector detects the corresponding index mark, a control signal is generated in response to a count value stored in the counter, wherein the control signal is used to control the rotation frequency of the corresponding storage disk; and
    (h) when the counters simultaneously reach terminal count, the counters are reloaded with the value corresponding to the target rotation frequency.

13. A masterless synchronization circuit for synchronizing a plurality of rotating storage disks, wherein an index mark is recorded on each storage disk, a read head is positioned above each storage disk, and a phase angle is associated with each storage disk measured from the read head to the index mark, synchronization circuit comprising:
    (a) a frequency locking circuit for locking each storage disk to a predetermined target rotation frequency; and
    (b) a phase locking circuit for phase locking the storage disks using a synchronization signal generated by at least two of the storage disks, comprising:
       (i) a detector for detecting the first phase angle to reach a predetermined phase angle value; and
       (ii) a means for phase locking to the storage disk corresponding to the detected phase angle.

14. The masterless synchronization circuit as recited in claim 13, wherein the frequency locking circuit comprises:
    (a) a measuring circuit for determining a rotation period of the storage disk by measuring a time the phase angle changes by 360 degrees; and
    (b) a control circuit for generating a control signal relative to a difference between the rotation period of the storage disk and a target rotation period corresponding to the target rotation frequency, wherein the control signal is used to control the rotation period of the storage disk.

15. The masterless synchronization circuit as recited in claim 14, wherein the measuring circuit comprises:
    (a) a detector for detecting when the index mark passes under the read head; and
    (b) a time measuring circuit for measuring a time between successive passes of the index mark under the read head.

16. The masterless synchronization circuit as recited in claim 14, wherein the control circuit comprises:

(a) a counter clocked relative to a value corresponding to the target rotation frequency;

(b) a detector for detecting when the index mark passes under the read head, wherein the control signal is generated in response to a value in the counter when the index mark is detected.

17. The masterless synchronization circuit as recited in claim 13, wherein the detector comprises:

(a) a counter associated with each storage disk clocked relative to a value corresponding to the target rotation frequency; and (b) a count signal for indicating when one of the counters first reaches a predetermined count.

18. The masterless synchronization circuit as recited in claim 17, wherein at least two of the counters generate a terminal count signal for generating the synchronizing signal.

19. The masterless synchronization circuit as recited in claim 17, wherein:

(a) the counters are loaded with the value corresponding to the target rotation frequency and decremented at each clock; and (b) the predetermined count is zero.

20. The masterless synchronization circuit as recited in claim 13, wherein the phase locking circuit comprises:

(a) a phase measuring circuit associated with each storage disk for measuring a phase difference relative to the synchronizing signal; and (b) a control circuit associated with each storage disk for controlling a rotation frequency of the storage disk in response to the corresponding phase difference.

21. The masterless synchronization circuit as recited in claim 20, wherein:

(a) the phase measuring circuit comprises a counter clocked relative to a value corresponding to the target rotation frequency; and (b) when the read head detects the index mark, a value in the counter corresponds to the phase difference.

22. The masterless synchronization circuit as recited in claim 21, wherein at least two of the counters generate a terminal count signal for generating the synchronizing signal.

* * * * *